This invention relates to tables used in the graphic arts industry, and more particularly to such a table for drawing, laying out, lining up and registering one or more designs, plates, photographs and the like wherein accurate positioning and measuring is desired.

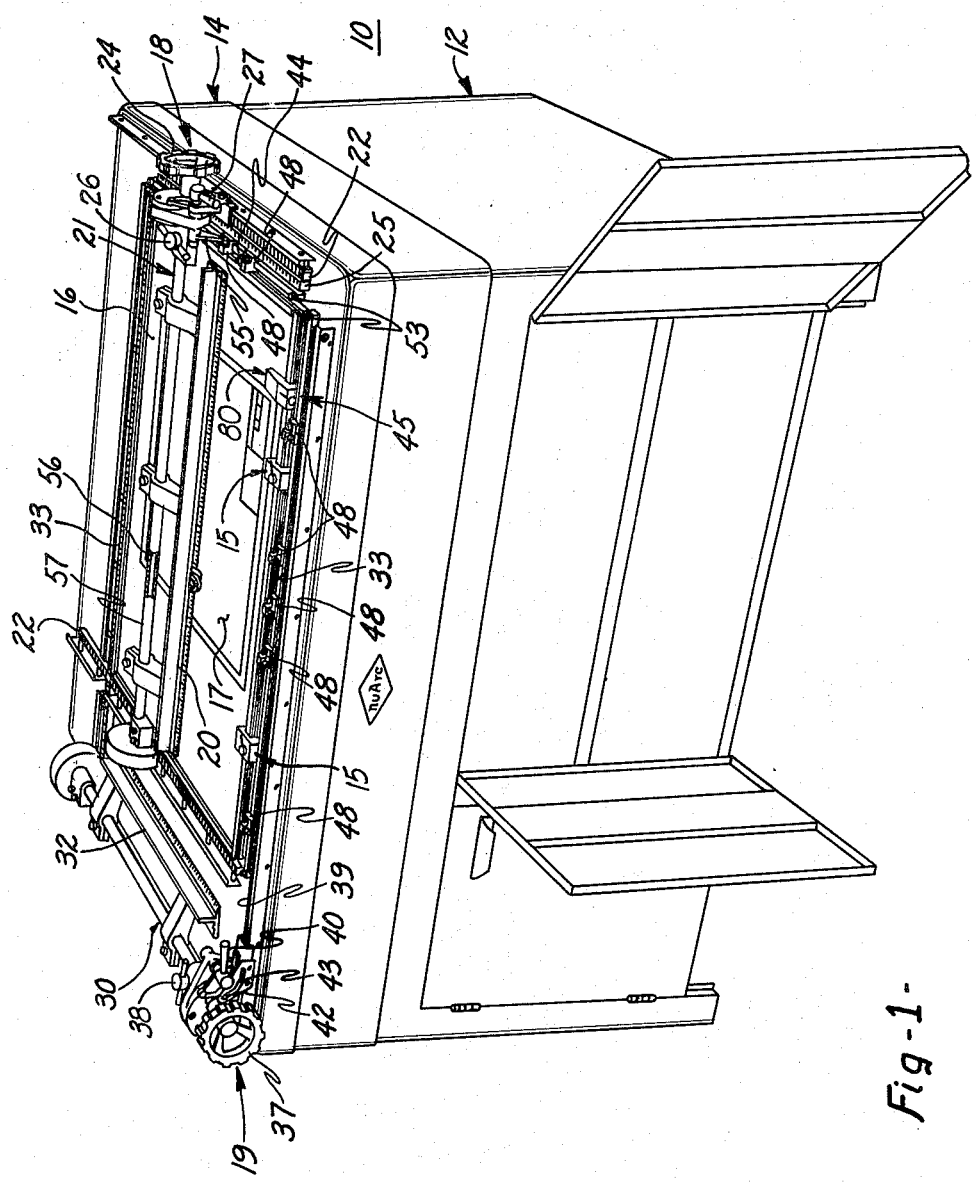

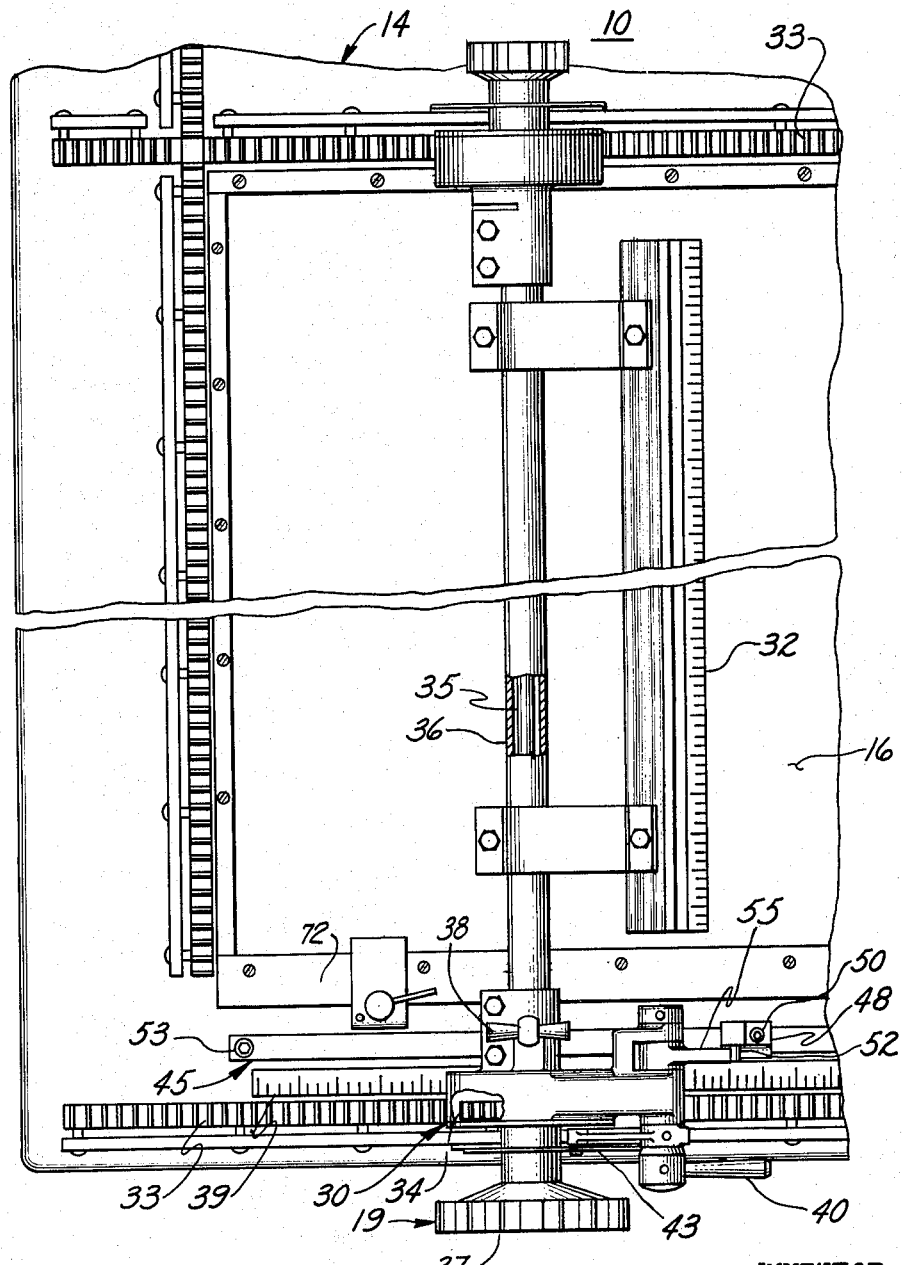

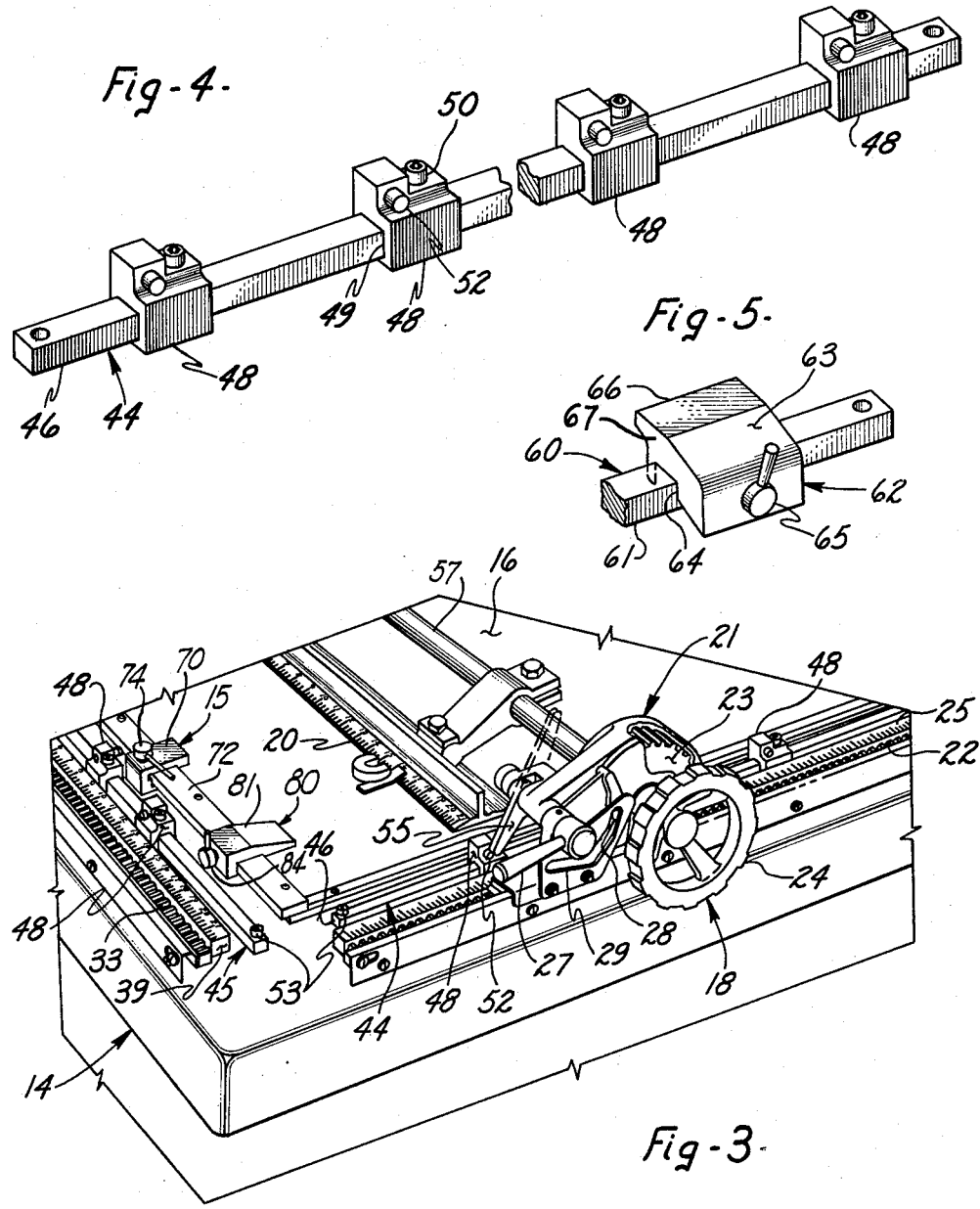

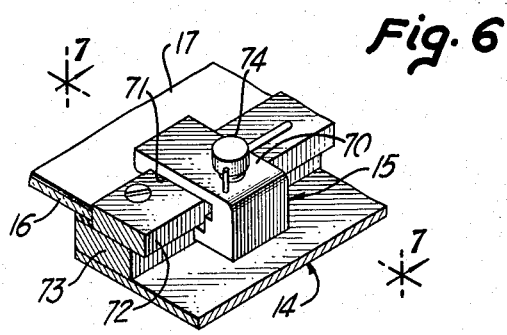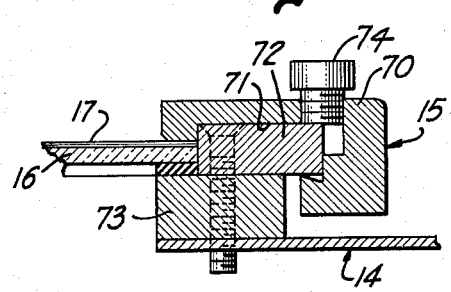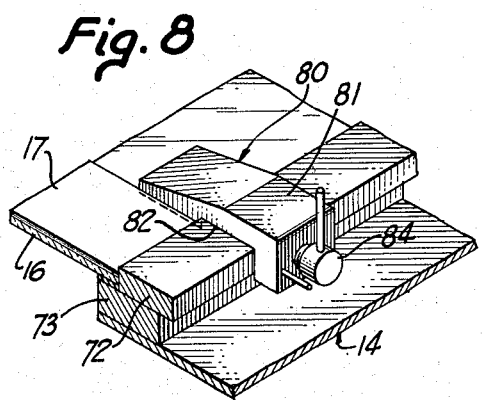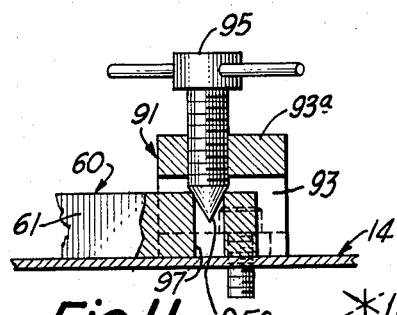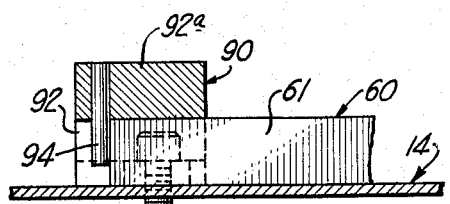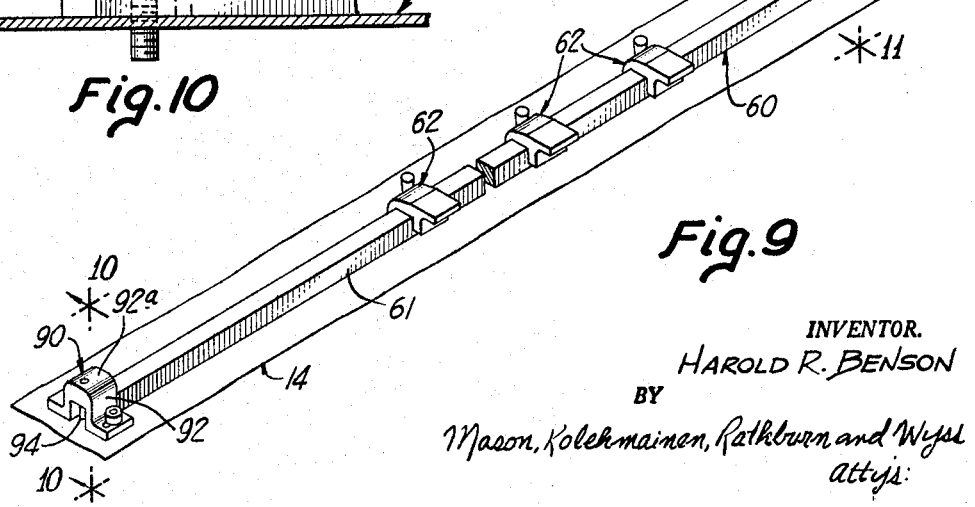
INVENTOR.
HAROLD R. BENSON 3,158,943
LINE-UP TABLE
Harold R. Benson, Lombard, Ill., assignor to The Nuarc Company, Chicago, Ill., a corporation of Illinois
Filed Jan. 31, 1962, Ser. No. 170,185
3 Claims. (Cl. 33—184.5)

In the graphic arts industry, it is common practice to arrange a series of drawings, negatives or other copy in a group prior to the making of lithograph, photoengraving, gravure and like plates whereby a plurality of reproductions can be printed or otherwise reproduced on a single sheet and then cut by machine to separate the same. Also, in making plates for more than one color printing, it is necessary that the various parts be in accurate registry to prevent offsets and the like from occurring in the printing or reproduction process. A line-up table is customarily provided with one or more fixed bars and a plurality of straight edge members each mounted on a carriage so that the straight edge member can be moved across the working area and adjusted into any desired position thereon. It is necessary that the straight edge members be accurately positionable so that a number of duplicates may accurately be made. To accomplish the lining up of the straight edge, it is customary to employ line-up and register tables having an adjustable straight edge which is normally adjusted to register with desired scale readings on a side scale fixed along one side of the table. In the ordinary course of operation, a considerable number of settings may be required, each of which involves a fractional calculation referenced to a spacing of the straight edge from a desired starting point.

Heretofore, the making of each plate, for example, the multiple plates used in multicolor printing, necessitated consecutive settings of the straight edge on the scale readings at the side of the table. Accordingly, inaccuracies due to human error were present. Moreover, it was frequently desirable to scribe additional new plates or make multiple press sheets at a later date and this required a complete resetting and recomputation of the line-up table.

An object of the present invention, therefore, is to provide an improved line-up table which overcomes the aforementioned difficulties.

Another object of the present invention is to provide a line-up table wherein the straight edges may be quickly and accurately aligned in predetermined positions during repetitive operations.

Yet another object of the present invention is to provide an improved line-up table capable of registering predetermined positions for its straight edges, and subsequently repeating the predetermined positions of the straight edges quickly and adequately.

Further objects and advantages of the invention will become apparent as the following description proceeds and the features of novelty which characterize the invention will be pointed out with particularity in the claims annexed to and forming a part of this specification.

The present invention relates to an improvement for a line-up table of the type having a substantially rectangular table top frame carrying a table top work panel. As is well known in the graphic arts, the table top is preferably translucent and light means are provided below the table top to illuminate the work carried by the table top. The line-up table is conventionally provided with a pair of spaced tracks arranged longitudinally and transversely of the table respectively on the table top frame thereof and fixed thereto which define a first pair of parallel trackways on opposite sides of the panel and extending longitudinally of the table adjacent the edges of the table top frame, and a second pair of parallel trackways perpendicular to the first pair and adjacent the other edges of the frame and extending transversely of the table. A straight edge carriage rides in each pair of tracks and supports a straight edge member.

According to the present invention, there are provided one or more stop bars removably secured parallel to one of the trackways relative to said table top frame. Each of the stop bars carries a plurality of stops adjustably secured along the respective stop bar. The stop bar and stops are removable as a unit from the table top frame. The straight edge carriages are provided with a dog mechanism operatively associated therewith and aligned to engage the stops on the stop bars thereby to position the straight edge. The respective dog mechanisms may be moved to positions in or out of engageable position with the stops so that the dogs are selectively rendered ineffective to position the straight edges, or alternatively, are operable to permit the straight edge carriage to move past a respective one of the stops.

The nature of the invention will best be understood when described in connection with the accompanying drawings, in which:

FIG. 1 is a perspective view of a line-up table incorporating the present invention;

FIG. 2 is a partial plan view of the improved line-up table of FIG. 1 and illustrated to a larger scale than FIG. 1;

FIG. 3 is a perspective view illustrating an operating position of the stops and dog mechanism according to the present invention;

FIG. 4 is a perspective view of a stop and stop bar assembly according to the present invention;

FIG. 5 is a partial perspective view illustrating another embodiment of stops according to the present invention;

FIG. 6 is an isometric view of a work hold-down device of the line-up table according to the present invention;

FIG. 7 is a sectional end view illustrating the work hold-down device of FIG. 6;

FIG. 8 is an isometric view illustrating the work positioning device of the line-up table according to the present invention;

FIG. 9 is a fragmentary perspective view of an improved line-up table illustrating a modified means of securing a stop bar assembly to the table;

FIG. 10 is an end view, partly in section, illustrating one of the stop bar securing devices of FIG. 9 and taken along line 10—10 thereof; and FIG. 11 is an end view, partly in section, illustrating another of the stop bar securing devices of FIG. 9 and taken along line 11—11 thereof.

Referring now to the drawings, and particularly to FIGS. 1 and 2, there is illustrated an improved register and repeat line-up table generally illustrated at 10. The line-up table 10 includes a base portion 12 which, as illustrated, is in the form of a storage cabinet, and a table top assembly forming a substantially rectangular table top frame 14 of heavy gauge metal and a translucent table top panel 16 adapted to hold a workpiece 17 (FIG. 1) by pressure-sensitive tape or other suitable work-holding means or devices 15 associated with the table top frame 14. The table top panel 16 is fixedly secured relative to the table top frame 14 through its marginal edge portions which overlie marginal edges of the table top frame. Moreover, the edges of the table top panel are spaced from the outer edges of the table top frame 14 to provide suitable spaces on the frame 14 for attachments and accessories of the line-up table 10.

In order to provide for the line-up of the workpiece 17 on the table top panel 16, there is provided a first or longitudinal straight edge assembly 18, illustrated in FIGS. 1 and 3, and a second, or transverse, straight edge assembly 19, illustrated in FIGS. 1 and 2.

Referring first to the longitudinal straight edge assembly 18, the straight edge assembly 18 includes a straight edge 20 and a straight edge carriage assembly 21 supporting the straight edge 20. The straight edge carriage assembly 21 is positioned to ride on a pair of parallel rack gear tracks 22 extending transversely across the table top assembly on the table top frame 14 between the table top panel 16 and the outer transverse edges thereof. As illustrated, the tracks 22 are in the form of a rack gear, and as is well known in the graphic art, the carriage assembly 21 includes a pair of spaced driving gears 23 drivingly associated through a drive shaft 56 within a tubular shaft housing 57, FIG. 1, only one of which is illustrated in FIG. 3, and positioned to mate with the rack gear track 22 to drivingly relate the carriage assembly 21 and the table top assembly. A manually rotated hand wheel 24 is operatively associated with the shaft 56 for advancing the carriage assembly 21 transversely over the table top panel 16. In order to accurately locate and position the carriage assembly 21, a positioning side scale 25 extends along one edge of the table top frame 14. Moreover, the carriage assembly 21 may fixedly be secured in any selected position along the tracks 22 by means of a key-shaped hand lock-screw 26, FIG. 1, extending through the housing 57 and adapted to fix and lock the drive shaft 56 thereof. As is known in the graphic arts, the straight edge 20 may be raised relative to, or lowered against, the table top panel 16 by means of a raising knob lever 27 operable through a follower 28 and cam track assembly 29, FIG. 3, to control the vertical positioning of the straight edge 20.

Except for dimensional variations, the transverse straight edge assembly 19 is identical to the longitudinal straight edge assembly 18 and includes a straight edge carriage assembly 30, FIGS. 1 and 2, transversely positioned across the table top assembly and including a straight edge 32 carried by the carriage assembly 30. The carriage assembly 30 is drivable along a pair of longitudinally extending tracks 33, each in the form of a rack gear, by a pair of driving gears 34, only one of which is illustrated in FIG. 2, and which are drivingly associated through a drive shaft 35 within a tubular shaft housing 36. A hand wheel 37 is drivingly connected to the drive shaft 35 for manually rotating the driving gears 34 to advance the straight edge assembly 19 longitudinally over the table top panel 16 along the tracks 33 thereof. The drive shaft 35, and consequently the straight edge assembly 19, may fixedly be secured in any position along its tracks 33 by means of a hand screw 38 extending through the shaft housing 36 and operative to clamp the drive shaft 35. Moreover, a front scale 39 is provided for accurately positioning the transverse straight edge assembly 19 in a desired position. The straight edge 32 may be moved vertically relative to the table top panel 16 through a raising knob lever 40 acting through a cam follower 42 and cam track assembly 43.

It will be appreciated that in order to avoid interference of the straight edge assemblies 18 and 19 with each other, their respective tracks 22 and 33 cross each other and extend outwardly from the table top panel 16 so that either or both of the straight edge assemblies 18 and 19 may be moved to its out-of-way position when it is not in use.

According to the present invention, a pair of stop bar and stop assemblies 44 and 45 are associated with the longitudinal and transverse straight edge assemblies 18 and 19, respectively. Since both of the stop bar and stop assemblies 44 and 45 are identical, except dimensionally as to their length, only the stop assembly 44 is hereinafter described in detail.

Referring now to FIGS. 3 and 4, the stop assembly 44 includes a rectangular stop bar 46 having a plurality of identical stops 48, for example, six in number, adjustably secured along the bar 46. Each of the stops 48 is provided with an aperture 49 of rectangular cross section conforming to the cross section of the stop bar 46; the stop bar 46 passes through the apertures 49 of the stops 48. Moreover, each of the stops 48 is provided with a set screw 50, which may be of the well known Allen type and which is engageable to tighten against the stop bar 46 to secure the stop 48 longitudinally in place along the bar 46. Moreover, each of the stops 48 is provided with a transversely extending stop pin 52. The stop assemblies 44 and 45 are rigidly secured to and spaced above the table top frame 16 by suitable means, indicated in the embodiment of FIGS. 1 to 3 as a plurality of Allen bolts 53 and spacing washers. The Allen bolts 53 are effective to align and position the stop assemblies 44 and 45 relative to the table top panel 16 and to provide for removably securing the stop bars 46 so that the stop assemblies 44 and 45, each including a stop bar 46 and a plurality of stops 48, may be readily removed from the line-up table 10 as a unit without altering the position of the stops 48 on the stop bars 46.

In order to provide for engagement of the carriage assemblies 21 and 30 with their respective stop assemblies 44 and 45, each of the carriage assemblies 21 and 30 are provided with a pivotally mounted stop finger or dog member 55 alignable with the stop pin 52 in the stops 48 associated with the respective straight edge assemblies 18 and 19. The dog members 55 are pivotally mounted on the frame of the carriage assemblies 21 and 30 and are pivotal out of engaging position with the stop pins 52 by mere flipping thereof from an engageable position, as indicated in solid in FIG. 3 to a disengaged position, as indicated in phantom in FIG. 3.

Although from the above description the operation of the register and line-up table is believed clear, however, briefly, it will be appreciated that in order to make a plate with a plurality of aligned plate frames, the straight edge assemblies 18 and 19 are utilized to set up the workpiece 17. At each of the line-up positions for the straight edge assemblies 18 and 19, the position thereof is recorded by the setting of an appropriate one of the stops 48 along the stop bar 46 so as to engage the respective stop finger 55 on the associated carriage assembly. In this manner, the stops are initially set for the original plate, press, bindery layout sheets, or the like, and as many duplicates are made with the original setting thereof as is necessary. After the proper number of duplicates has been made as it required, the stop assemblies 44 and 45, with the stops 48 in set position on the stop bars 46, are removed from the table top frame 14 by removal of the bolts 53 and the stop assemblies 44 and 45 are then set aside until the job has been run and completed. If, at any time, it becomes necessary to scribe new plates or make multiple press sheets, it is simply necessary to put the original bars back in position on the table top frame 14 and the original settings are duplicated quickly and accurately. Of course, it is understood that extra bars and stops may be had so that the user may store current programmed stop assemblies indefinitely.

It will be understood that the stop assemblies 44 and 45 may take on a plurality of different configurations. For example, FIG. 5 illustrates a modified form of stop assembly 60 including a rectangular stop bar 61 provided with a plurality of longitudinally adjustable stops 62, only one of which is illustrated in FIG. 5. The stops 62 are formed with a body portion 63 having a downwardly opening groove 64 conforming to the cross-sectional shape of the bar 61. The bar 61 rests in the groove 64 so that the stop 62 is slidable thereon. A manually operable set screw 65 threadedly extends through the body portion 63 of the stop 62 thereby to grip the stop bar 61 and to secure the stop 62 in its selected position. One side 67 of the stop 62 is adapted to engage a respective stop finger on the carriage assembly of a line-up table. Additionally, the stop 62 is provided with a pointer 66 to facilitate positioning of the stops using the scales 25 or 39.

For holding the workpiece 17 on the table top panel 16, there may be provided the work-holding device 15, as best illustrated in FIGS. 6 and 7. The work-holding device 15 is formed with a body portion 70 provided with a somewhat rectangular recess 71 receiving a rectangular holder bar 72, fixedly secured to the table top frame 14 through a spacer bar 73. The work-holding device 15 is slidably mounted on the bar 72 and secured in the desired position by a hand set screw 74 extending through the body portion 70 to clamp the holder bar 72.

Yet another work-holding device 80 forming an edge-guide is illustrated in FIG. 8. As therein illustrated, the work-holding device 80 includes a body portion 81 provided with a somewhat rectangular recess 82 receiving the rectangular holder bar 72. The work-holding device 80 is slidably mounted on the bar 72 and secured in the desired longitudinal position thereon by a hand set screw 84 extending through the body portion 81 thereof to clamp to the holder bar 72.

To more accurately align the stop bar assembly 44 with the table top assembly, the Allen screws 53 of the embodiments of FIGS. 1 to 5 may be replaced by a pair of spaced apart stop bar holder members 90 and 91 as best illustrated in FIGS. 9 to 11. The stop bar member holders 90 and 91 both include generally inverted U-shaped brackets 92 and 93, respectively, having the ends of their legs secured to the table top frame 14 in any suitable manner and each is provided with a bight portion 92a, 93a, respectively, spaced above the table top assembly to form a closed frame for receiving the ends of a stop bar assembly, here illustrated as the stop bar assembly 60. One of the brackets 90 is provided with a stop pin 94 for locating the longitudinal positioning of the stop bar assembly 60. The other bracket 91 of the stop bar holders is provided with a hand set screw 95 having a tapered point 95a and extending through the bight portion 93a of the bracket 93. The tapered point 95a thereof fits against the edge of a hole 97 in the end of the stop bar assembly 60 such that the hole 97 is smaller in diameter than the body of the screw 95. The set screws 95 thereby accurately locates and positions the stop bar assembly 60.

While preferred embodiments of the invention have been described by way of illustration, many modifications will occur to those skilled in the art. It is therefore intended in the appended claims to cover all such modifications as fall within the true spirit and scope of the invention.

What is claimed as new and desired to be secured by Letters Patent of the United States is:

1. A line-up table comprising a substantially rectangular table top frame, a table top panel having marginal portions overlying portions of said frame and spaced from the outer edges of said frame, spaced tracks arranged longitudinally and transversely of said frame and fixed thereto defining a first pair of parallel trackways on opposite sides of said panel and extending longitudinally of said table adjacent the edges of said frame and a second pair of parallel trackways perpendicular to said first pair adjacent the other edges of said frame and extending transversely of said table, straight edge members extending transversely and longitudinally respectively of said table top panel, straight edge carriages riding in said trackways and supporting a respective one of said straight edge members, a longitudinal and transverse stop bar each removably secured parallel to a respective one of said trackways, means for accurately positioning each of said bars to said table top frame, a plurality of stops adjustably secured along each of said stop bars and removable from said table as a unit with said stop bars, and dog mechanism operatively associated with said straight edge carriages for engaging said stops to position said straight edge members.

2. A stop assembly for use in a line-up table of the type including a table top having spaced tracks arranged longitudinally and transversely thereof and fixed thereto, said tracks defining a first pair of parallel trackways extending longitudinally of said table adjacent the edges thereof and a second pair of parallel trackways perpendicular to said first pair adjacent the other edges of said table top and extending transversely thereof, straight edge members extending transversely and longitudinally respectively of said table top, straight edge carriages riding in said trackways and supporting a respective one of said straight edge members, and a dog mechanism operatively associated with said straight edge carriages for positioning said straight edge members, said stop assembly comprising a stop bar, means for removably securing said stop bar to said table top in accurately aligned position parallel to a respective one of said trackways, and a plurality of stops adjustably secured along said stop bar and adjustably movable longitudinally along said stop bar to positions representative of selected positions of one of said carriage assemblies, said stops being secured to said bars as a unit therewith, each of said stops including stop means positionable to engage the dog mechanism on the carriage of said table when said stop assemblies are secured to said table.

3. A line-up table comprising a substantially rectangular table top member, a pair of spaced trackways secured on said table top member, a straight edge carriage riding in said trackways, a straight edge member carried by said carriage, a stop bar and stop assembly including a stop bar and a plurality of stops adjustably secured along said stop bar, a pair of spaced stop bar securing members carried by said table, each of said members being of generally inverted U-shape and having their legs secured to said table top member and having a bight portion spaced from said table top member forming a closed frame therewith for receiving the ends of said stop bar, one of said stop bar securing members being provided with an inwardly extending stop pin for limiting the longitudinal placement of said stop bar, the other of said stop bar securing members being provided with a hand set screw extending through the bight portion thereof and provided with a tapered point adapted to seat against the edge of an opening in said stop bar, said screw being of larger diameter than said opening, said stop bar and stop assembly being assembled within the frame formed by said table top member and said stop bar supporting members, and mechanism operatively associated with said carriage for engaging said stops to position said straight edge members.

References Cited in the file of this patent

UNITED STATES PATENTS

| 1,410,153 | Barbeau | Mar. 21, 1922 |
| 1,601,461 | West | Sept. 28, 1926 |
| 1,668,592 | Huebner | May 8, 1928 |
| 2,190,947 | Kinzler | Feb. 20, 1940 |
| 2,901,832 | Hulen | Sept. 1, 1959 |
| 3,000,104 | Polayes | Sept. 19, 1961 |

FOREIGN PATENTS

| 717,438 | Great Britain | Oct. 27, 1954 |

ISAAC LISANN, *Primary Examiner.*